United States Patent
Mallary

(10) Patent No.: US 6,236,513 B1
(45) Date of Patent: May 22, 2001

(54) INTEGRATED OBJECTIVE/SOLID IMMERSION LENS FOR NEAR FIELD RECORDING

(75) Inventor: Michael Mallary, Sterling, MA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 09/345,641

(22) Filed: Jun. 30, 1999

(51) Int. Cl.[7] .................................. G02B 3/00; G02B 7/02
(52) U.S. Cl. ........................ 359/642; 358/719; 358/819
(58) Field of Search ...................... 359/642, 648, 359/708, 712, 819, 719

(56) References Cited

U.S. PATENT DOCUMENTS

| | | | |
|---|---|---|---|
| 5,004,307 | 4/1991 | Kino et al. | 359/356 |
| 5,121,256 | 6/1992 | Corle et al. | 359/664 |
| 5,125,750 | * 6/1992 | Corle et al. | 359/819 |
| 5,497,359 | 3/1996 | Mamin et al. | 369/44.15 |
| 5,625,617 | 4/1997 | Hopkins et al. | 369/121 |
| 5,729,393 | 3/1998 | Lee | 359/819 |
| 5,828,482 | 10/1998 | Jain | 359/211 |
| 5,828,644 | 10/1998 | Gage et al. | 369/112 |
| 5,831,797 | 11/1998 | Schaenzer et al. | 360/114 |
| 5,859,814 | 1/1999 | Kino et al. | 369/13 |
| 5,870,362 | 2/1999 | Boutaghou | 369/44.14 |
| 5,978,139 | * 11/1999 | Hatakoshi et al. | 359/565 |
| 6,043,940 | * 3/2000 | Kamiyama et al. | 359/719 |
| 6,061,322 | * 5/2000 | Jain et al. | 369/99 |
| 6,084,846 | * 7/2000 | Jordache et al. | 369/112 |
| 6,154,326 | * 11/2000 | Ueyanagi et al. | 359/819 |

OTHER PUBLICATIONS

T. Suzuki, Y. Itoh, M. Birukawa, W. Van Drent, "Solid Immersion Lens Near Field Optical Approach for High Density Optical Recording", *IEEE Trans. on Magnetics*, vol. 34, No. 2, Mar. 1998, pp. 399–403.

* cited by examiner

*Primary Examiner*—Scott J. Sugarman
*Assistant Examiner*—Saeed Seyrafi
(74) *Attorney, Agent, or Firm*—David B. Harrison

(57) ABSTRACT

An objective-solid immersion lens assembly includes a unitary solid immersion lens body having an optical axis, an evanescent wave-conducting region along the optical axis, and a substantially spherical surface portion surrounding the optical axis oppositely the wave emitting region. A discrete objective lens is attached to, or otherwise formned at, the solid immersion lens body at the substantially spherical surface portion to be in alignment with the optical axis. Several manufacturing methods for making an air bearing slider including the objective-solid immersion lens assembly are disclosed.

16 Claims, 7 Drawing Sheets

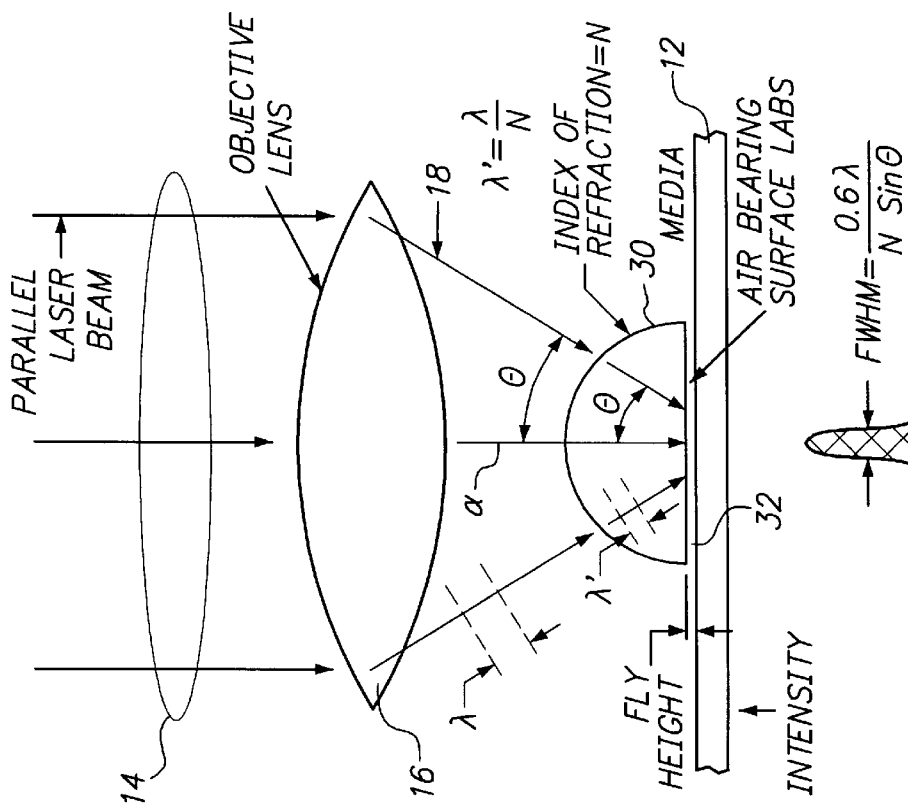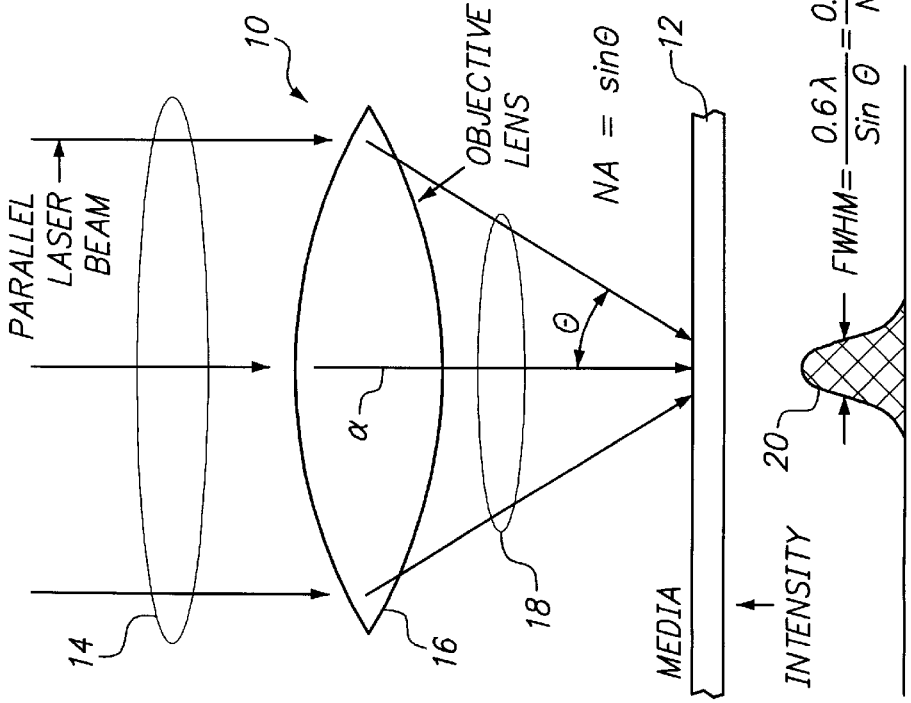

SUPER-SIL SYSTEM

INTEGRATED OBJECTIVE SIL

HOLE PROFILE CONTROLS SPOTTER DEPOSITION THICKNESS

FOCAL POINT VARIABLITY WITH SIL RADIUS FOR AN OSIL TYPE LENS

CONSTANT FOCAL POINT BAFFLE
FOR EACH HOLE

BAR BAFFLE

INTEGRATED OBJECTIVE/SOLID IMMERSION LENS FOR NEAR FIELD RECORDING

FIELD OF THE INVENTION

This invention relates generally to optical data storage. More particularly, the present invention relates to a method and apparatus for a compact flying optical head including an integrated objective/solid immersion lens enabling near field recording and playback principles.

BACKGROUND OF THE INVENTION

Spatial resolution of optical recording systems is improved by use of a hemispherical Solid Immersion Lens (SIL) placed in close proximity to the recording surface. The wavelength ($\lambda$) of the light in the SIL ($\lambda s$) is reduced by the index of refraction (Ns) of the SIL. In other words:

$$\lambda s = \lambda/Ns \quad (1)$$

In a diffraction-limited system consisting of only an objective lens (OL), having a numeric aperture (NA) (where NA=sin(ThetaMax) where ThetaMax is the maximum angle of incidence of the light relative to the optical system axis), the focal spot has a full width at half maximum amplitude (FWHM) given by:

$$FWHM = 0.6 * \lambda/NA \quad (2)$$

An optical path arrangement in accordance with equation (2) is illustrated in FIG. 1. In this figure, an optical head 10 is positioned closely above a relatively moving optical storage medium, such as a rotating optical disk 12. One example of an optical head including an objective lens formed as part of an air bearing slider is described in commonly assigned U.S. Pat. No. 5,105,408 to Lee et al., entitled: "Optical Head with Flying Lens", the disclosure thereof being incorporated herein by reference. In the present FIG. 1 example 10, a collimated light beam 14 from e.g. a laser light emission source (not shown in FIG. 1) is converged to a focal point at the media 12 by a conventional objective lens 16. With the FIG. 1 optical system 10, the resultant FWHM light intensity distribution (0.6*$\lambda$/NA) is shown as graph 20 of FIG. 1A (drawn in alignment with an optical axis $\alpha$ of the FIG. 1 optical system 10).

By placing the center of a hemispherical SIL 30 in alignment with the optical axis $\alpha$ and at the focal point of the FIG. 1 system 10, the effective wavelength can be reduced by 1/Ns. Therefore, $$FWHMsil = 0.6\lambda s/NA = 0.6*\lambda/NA*Ns \quad (3)$$

Therefore the spot size is reduced by a factor of 1/Ns and the potential storage capacity is increased by $Ns^2$, as shown in FIGS. 2 and 2A. In FIG. 2 a hemispherical flat surface 32 of the SIL 30 forms a part of an air bearing surface of the optical head, enabling the SIL 30 to be placed at a flying height very close to the surface of the optical disk 12 as is known with conventional flying heads used in magnetic hard disk drives.

The spot size of the FIG. 2 type of system can be further reduced by using a Super-Sphere SIL (SSIL) 40. The exemplary SSIL 40 is intermediately between a hemisphere and a complete sphere, as shown in FIG. 3. The SSIL 40 has a flat surface 42 that is located at a focal distance (Ds) from the center of the sphere having a radius (R). Accordingly, focal distance is given by:

$$Ds = R/Ns \quad (4)$$

If the focal point of the objective lens (OL) 16 is set at a distance R*Ns in back of the SSIL center (when the SIL is not present), then the light rays will converge to a point that is at the back surface of the SSIL 40 (equation 4). This geometry also surprisingly achieves an aberration free focus in that all rays converge to this point. One advantage of this focal arrangement is that the steeper angle of the most extreme rays in the SSIL (Thetamaxsil) results in a larger effective SSIL numeric aperture (NAssil=sin(Thetamaxsil)). Therefore, the FWHM is further reduced:

$$FWHMssil = 0.6*\lambda/Ns*NAssil \quad (5)$$

Since the improvement in NAssil involves very complex algebra, the interested reader is referred for further explanation to an article by T. Suzuki et al., entitled: "Solid Immersion Lens Near Field Optical Approach for High Density Optical Recording", IEEE Trans. on Magnetics, Vol. 34, No. 2, March 1998, pp. 399–403.

Improvements in FWHM offered by the SIL and the SSIL systems come with certain limitations and drawbacks. For example, the back surface of the high index SIL must be maintained in close proximity to the disk surface (e.g. 3 microinches). Also, the SIL must be formed as an accurate sphere, and the objective lens must be accurately aligned to one of the two focal points discussed above. Further, with the SSIL approach, these requirements are even more stringent than they are with the SIL approach. Therefore, practical implementation and use of the SSIL has heretofore been deferred for future development and refinement.

Present SIL systems require laborious and complex optical path alignment techniques and steps for aligning the objective lens and the SIL along an optical axis as well as the separate manufacture of each lens. One example of this prior approach is found in U.S. Pat. No. 5,729,393 to Lee et al., entitled: "Optical Flying Head with Solid Immersion Lens Having Raised Central Surface Facing Medium". The Lee et al. '393 patent describes an optical near field recording system in which an objective lens and a SIL are optically aligned and mounted in optical alignment to an air bearing slider. The objective lens is separate from, and apparently not in physical direct contact with, the SIL. A bottom surface of the SIL is contoured to present a closest point to the rotating recording and playback optical disk medium. Features of the SIL and slider recede adjacently away from the closest point and function at least in part as an air bearing, so that perturbations in the flying attitude of the slider do not affect optical transmission between the closest point of the bottom surface of the SIL and the storage medium.

U.S. Pat. No. 5,497,359 to Mamin et al., entitled: "Optical Disk Data Storage System with Radiation-Transparent Air-Bearing Slider", discloses an aspheric SIL that does not require a separate objective lens. The disclosed aspheric SIL was made of a single material, as by injection molding or by diamond micro-machining. Injection molding implies use of a plastic material which would necessarily further imply a low index of refraction (e.g. 1.5). Such materials and approaches would limit resolution. Precision micromachining of complex aspheric surfaces is not presently viable for a reproduceable, low cost manufacturing technique for volume production.

Therefore, a hitherto unsolved need has remained for a compact, yet readily manufacturable, solid immersion lens system which integrally includes an objective lens in a manner overcoming limitations and drawbacks of the prior designs and methods.

SUMMARY OF THE INVENTION WITH OBJECTS

One object of the present invention is to provide an integrated objective SIL (OSIL) which has a high numeric aperture, which has reduced reflectance, and which is characterized by improved manufacturability in ways overcoming limitations and drawbacks of the prior art.

Another object of the present invention is to locate the objective lens directly on a surface portion of the SIL in a manner achieving a focal distance comparable to that achievable with a SSIL system and with less complex manufacturing and alignment complexity and cost.

A further object of the present invention is to provide methods and tooling for aligning and manufacturing an integrated objective SIL lens system having high numeric aperture and reduced reflectance.

In accordance with principles of the present invention, an objective-solid immersion lens assembly includes a unitary solid immersion lens body having an optical axis, an evanescent wave conducting region along the optical axis, and a substantially spherical surface portion surrounding the optical axis oppositely the wave emitting region. A discrete objective lens is attached to the solid immersion lens means at the substantially spherical surface portion to be in alignment with the optical axis. Attachment may be by a light-transparent adhesive material or other suitable attachment means. Preferably, the light-transparent adhesive material has an index of refraction intermediate between an index of refraction of the solid immersion lens body and an index of refraction of the discrete objective lens. In one preferred utilization, the objective-solid immersion lens assembly is included as part of an air bearing slider such that the wave conducting region is aligned with an air bearing surface of the slider. Preferably, the wave conducting region is aligned with the air bearing surface by a lapping process following attachment of the solid immersion lens assembly to a slider wafer body including the air bearing slider. In alone preferred form the solid immersion lens body follows a substantially hemispherical shape, while in another preferred form the solid immersion lens body has a shape intermediately between a hemisphere and a sphere. The objective lens may be formed separately of the optical body, or it may be deposited onto the optical body, either before or after the body is lapped or otherwise formed into a solid immersion lens.

In another aspect of the present invention, a method for making an objective-solid immersion lens and air bearing slider assembly includes steps of:

forming an objective lens on a substantially spherical optical body, forming a hole in a slider wafer body, securing the spherical body and objective lens to the slider wafer body in the hole in alignment with an optical axis normal to a major surface of the wafer body oppositely of the objective lens, lapping the major surface of the wafer body and a portion of the optical body to form an air bearing surface as well as an evanescent wave conducting region of the optical body at the air bearing surface, and forming the wafer body into a discrete slider including the air bearing surface and objective-solid immersion lens.

Preferably, the step of securing the spherical body in the wafer hole comprises use of a backing plate fixture, or more preferably comprises further steps of forming a precise contact region along a baffle bar fixture at a height Hb, registering the baffle bar fixture in alignment with the wafer at the major surface, and aligning the spherical optical body in contact with the precise contact region prior to securing the spherical body in the wafer hole. In this more preferable alignment method, further steps include providing a precision notch in the wafer body, and securing the baffle bar fixture in the notch in order to register the baffle bar fixture in alignment with the wafer at the major surface.

The spherical optical body preferably comprises a glass material and the slider wafer comprises a ceramic material, so that the spherical optical body may be attached to the slider wafer in the hole by low temperature glass bonding techniques.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 1 is an enlarged diagram in elevation of a conventional optical head including objective lens and optical path leading to optical media of a conventional optical recording system.

FIG. 1A is a graph of light intensity and spot width achieved at the FIG. 1 media with the FIG. 1 conventional optical head.

FIG. 2 is an enlarged diagram in elevation of a conventional optical head including a solid immersion lens and objective lens, and an optical path leading to optical media, of another conventional optical recording system.

FIG. 2A is a graph of light intensity and spot width achieved at the FIG. 2 media with the FIG. 2 conventional optical head.

DETAILED DESCRIPTION OF PREFERRED EMBODIMENTS

Figure 3:
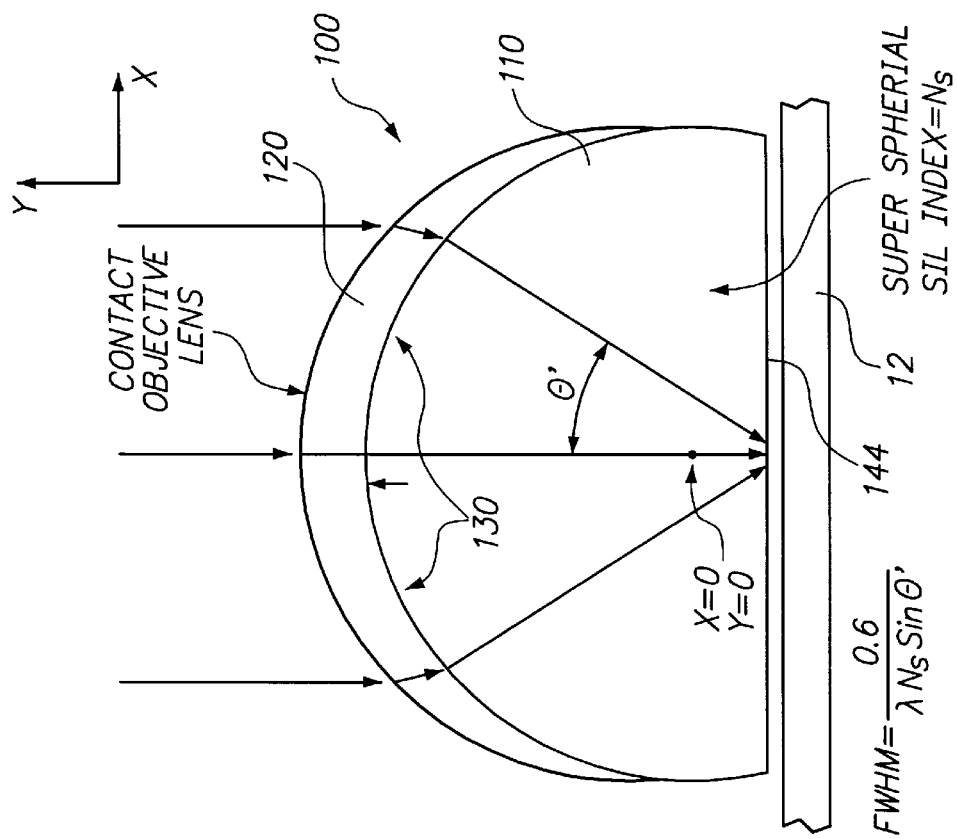
FIG. 3 is an enlarged diagram in elevation of a conventional optical head including a super solid immersion lens and objective lens, and an optical path leading to optical media (not shown in this figure).
Figure 4:
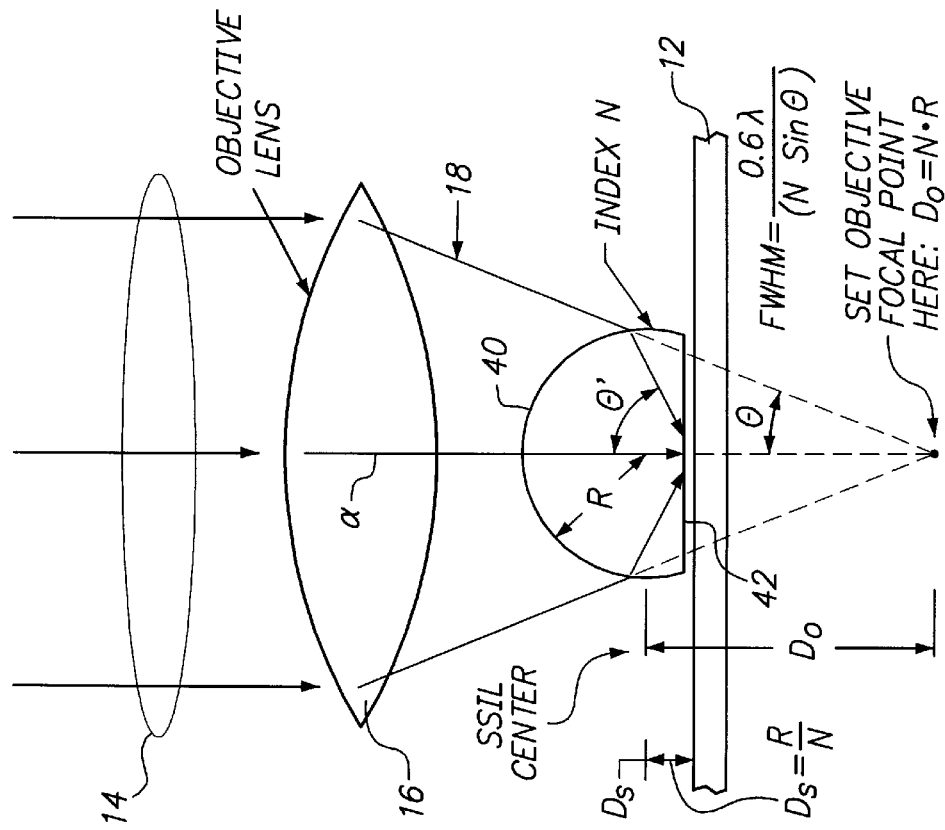
FIG. 4 is an enlarged diagram in elevation of an objective lens integrated with a super solid immersion lens for an optical recording system in accordance with principles of the present invention.

In accordance with principles of the present invention exemplified in FIG. 4, an objective lens/SIL (OSIL) system 100 includes a SSIL 110 and an objective lens 120. While the optical head 100 includes a SSIL 110, those skilled in the art will appreciate that the objective lens 120 may be applied to a conventional SIL with improved results. The objective lens 120 is located in direct support proximity to a spherical outer portion 130 of the SSIL 110. The outer shape and thickness of the objective lens 120 is determined by the system of equations set forth in Appendix I included hereinbelow for a SSIL type setting of the focal distance Fs in accordance with Equation 4, above. However, by employing an OSIL system, such as system 100, a range of shapes and corresponding values of Fs are available to the designer. The highest possible NAosil is achieved with the lowest Fs. This optical system 100 has the objective lens 120 taper to zero thickness at the outer radius of the SSIL 110. In this case:

$$Fs = R*\tan(\arcsin(1/Ns)) \qquad (6)$$

The corresponding numeric aperture is:

$$NAosil = \operatorname{sqrt}(1 - 1/Ns^2) \qquad (7)$$

Therefore, for Ns=2.1, the limiting NAosil is 0.88. This value is much higher than conventional SIL systems wherein the numeric aperture is typically 0.64, and somewhat higher than proposed SSIL systems wherein the numeric aperture is projected at 0.8.

Figure 4A:
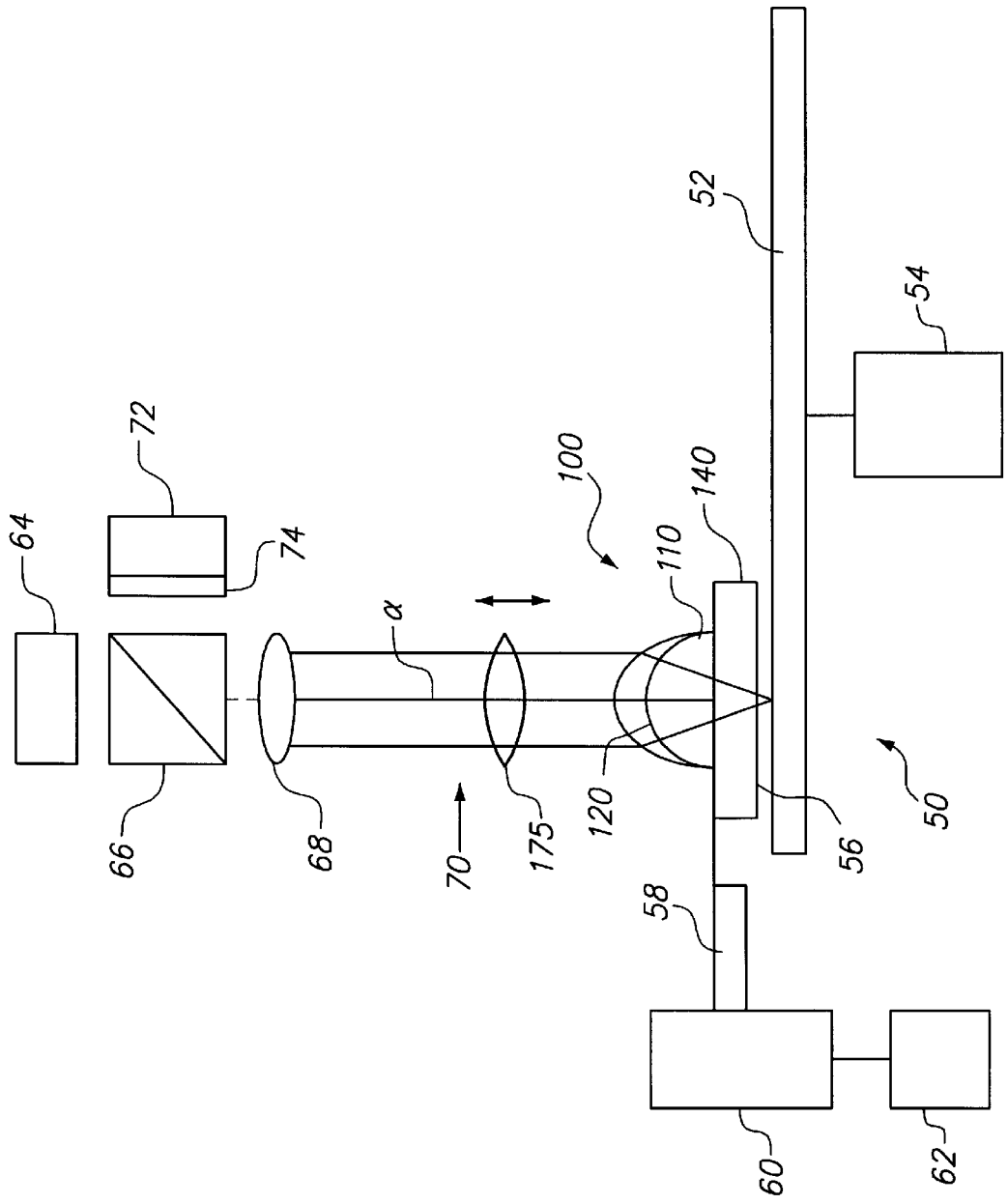
FIG. 4A is a highly diagrammatic view of an optical recording and playback system employing the FIG. 4 lens system in accordance with principles of the present invention.

Preferably, although not necessarily, the OSIL system 100 is included with an optical or magneto-optical recording device 50, as shown in broad functional outline in FIG. 4A. Therein, the recording and playback device 50 includes a storage disk 52 having an optically recordable and readable surface. The disk 52 is rotated at a controlled angular velocity by a disk motor 54. The OSIL system 100 in the device 50 is formed as part of an air bearing slider 56 which is maintained in very close proximity to the disk storage surface upon an air bearing. The slider 56 is secured to an arm 58 and is positioned radially relative to the disk 52 by e.g. a rotary voice coil actuator structure 60 which includes a rotary voice coil motor. A laser light source emits light waves which pass through a beam splitter 66 and a collimating lens 68 which establishes near parallelism of the light rays to form a collimated beam 70 along optical axis α. A photodetector 72 including a polarizer 74 detects light energy returned from the storage surface in accordance with the known Kerr effect, in this example. Those skilled in the art will appreciate that the optical path shown in FIG. 4A is highly diagrammatic and may be modified in a practical embodiment of an optical recording and playback device in order to satisfy particular packaging constraints.

The following Table 1 is constructed for a sub-optimal SSIL-type setting of Fs using a modeling program known as SILObjTest.for. Table 1 lists the on-axis thickness of the objective lens layer and the NAosil for three objective refractive index values. An objective lens maximum thickness on the optical axis and an internal numerical aperture is given for the various refractive indices for an OSIL system. In this OSIL system the SSIL has a diameter of 1 mm and an index of refraction of 2.0.

TABLE 1

| Objective Index, No | To, Maximum Thickness | Internal NA, NAs |
|---|---|---|
| 1.4 | .0815 mm | .67 |
| 1.5 | .0415 mm | .59 |
| 1.6 | .0208 mm | .51 |

Various manufacturing processes can be employed to achieve the desired geometry for the OSIL system 100. One process is to injection-mold the objective lens 120 with the proper shape and then glue it to the SIL or SSIL 110 along a bonding interface 130 with an adhesive having an index of refraction intermediately between the index of the molded objective lens 120 and the index of the SIL or SSIL 110. This approach will further reduce reflections and will forgive somewhat any lack of perfect sphericity of the objective lens 120 or SSIL 110 over the bonding interface 130.

If a sectional bond line along the bonding interface 130 is relatively thick, the lens design equations given below must be modified so that all wave paths have an equal number of wavelengths to the desired system focal point. Periodically placed molded projections on the spherical inner surface of this contact objective can be provided to achieve reproducible spacing in volume manufacturing in accordance with this approach. Thick bonds are preferred to thin bonds because thick bonds enable excess adhesive to be squeezed out of the optic path and also enable automatic alignment and set of the focal depth of the lens system 100 under feedback control of automatic tooling and fixtures. In this process the contact objective lens 120 is bonded after the SSIL 110 has been bonded by suitable bonding glass 150 into a cavity 142 of an air bearing slider 140 formed of e.g. ceramic material, and then lapped and contoured to form a slider air bearing surface (ABS) 144 which is very similar to conventional approaches used to make air bearing sliders for magnetic disk recording devices.

A second manufacturing approach is to fill an objective lens mold with plastic material in plastic state and push the SIL into the mold and molten plastic until the SIL contacts registration locations of the mold walls. A surface activation treatment of the SIL may be needed to promote effective adhesion between the objective lens and the SIL if the plastic is not intrinsically an adhesive.

Figure 5:
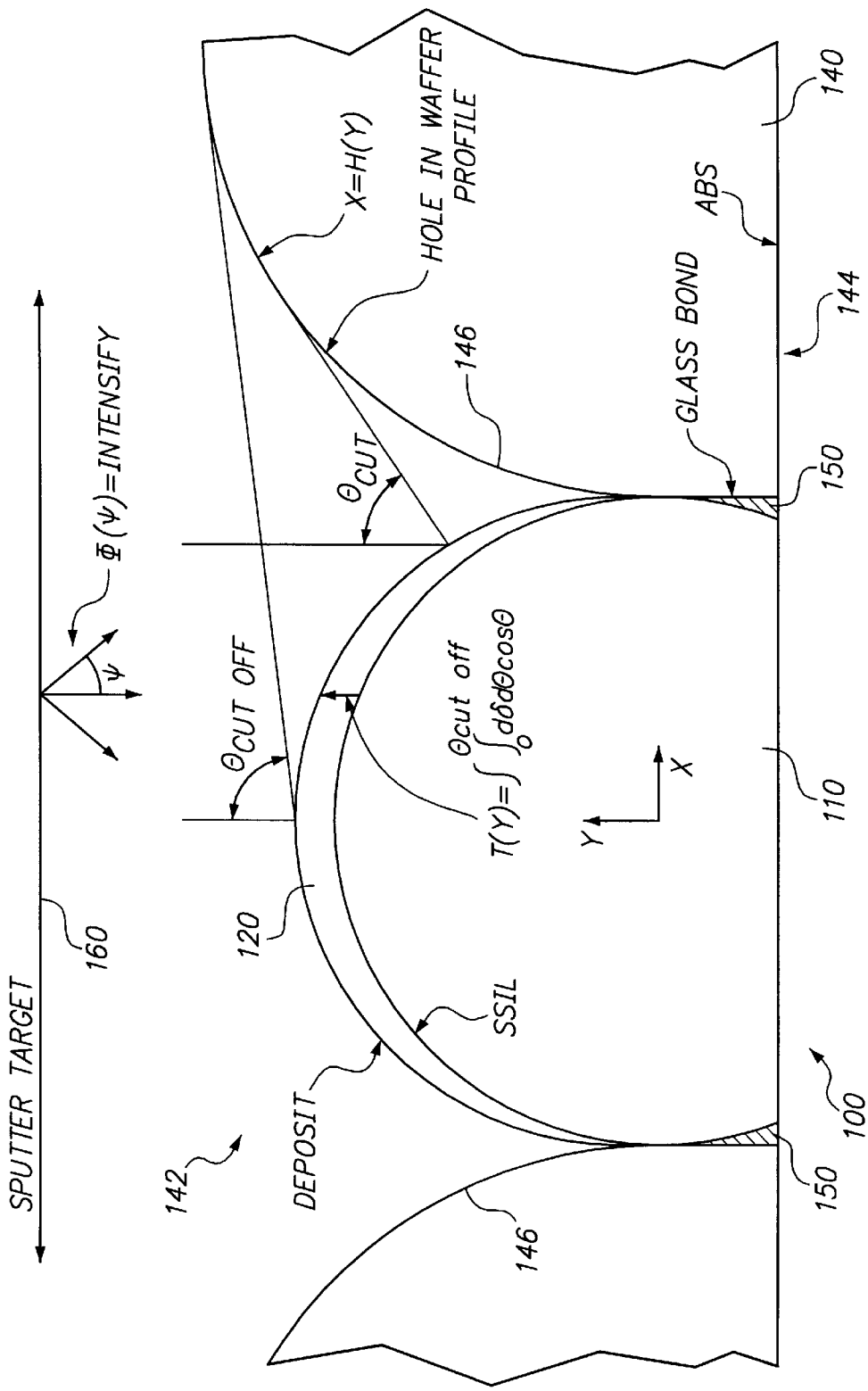
FIG. 5 is an enlarged diagram in elevation of one manufacturing method for manufacturing the FIG. 4 lens system in accordance with principles of the present invention.

A third process is to vacuum deposit the material of the objective lens onto the surface of the SIL. Sputtering, evaporation, and laser ablation are examples of potential deposition processes. A sputter target 160 is shown in the FIG. 5 view. Exact shaping can be achieved by controlling the angular distribution of the incident material emanating from sputter target 160. Controlled rocking and rotation of the slider 140 will aid achieving the desired outer surface contour of the objective lens 120.

For example, from Table 1 above it can be seen that a 1 mm diameter SSIL needs only 41.5μ of maximum deposited thickness of material with an index of refraction of 1.5. This is approximately the thickness of the sputter deposited $Al_2O_3$ ceramic layers in a thin film magnetic recording head, for example, and is well within tolerances of existing sputter deposition processes.

It should be noted that depositing the objective lens onto the SSIL 120 after it is bonded into the slider cavity 142 will automatically achieve perpendicularity with respect to the disk 12 and alignment of the optical axis α of the OSIL system 100. It would also allow the use of the cavity aperture geometry for controlling the angular distribution of the incident material and thus the thickness of the deposit versus radial portion. For example, in the FIG. 5 example each slider aperture 142 is defined by a curved surface wall 146.

Regardless of the particular process sequence followed, vacuum deposition also allows the refractive index of the objective to be smoothly graded from a low value to a high value by using a range of target materials. This would further reduce the reflective losses of the system. The reflectivity at an interface at normal incidence is proportional to the square of the change in refractive index. Therefore, many small changes are preferred to one large change. In any case, even if only one deposited material is used, the system reflectance is reduced because the number of air to solid interfaces is reduced by one with this integrated approach.

In one variation of a process sequence, the focal depth of the OSIL is set by lapping the air bearing surface (ABS) 144 until the focal spot of the system 100 is minimal. This can be done oil wafer, or after the wafer is cut into bars if the SILs have a uniform diameter and bonding location in each wafer hole 142. Alternatively a coarse lap may be performed on the wafer, followed by a feedback controlled lap at a slider bar level or at a single slider level. Also the focus could be adjusted by additional vacuum deposition onto the objective lens or by ion milling of the objective lens.

Variability in radius of the SIL, dR, can be a serious difficulty for any process that does not include some kind of feedback control of the lapping of the ABS. If the untapped SIL spheres are simply dropped into generally cylindrical wafer holes defined by a straight cylindrical wall 147 until contacting a backing plate 170 in alignment with a wafer ABS surface 172, see FIG. 6, and are then glass-bonded to the wafer walls 147, the variation in the focal point relative to a fixed reference will be dR*(1−tan(arc sin(1/Ns))). For Ns=2 this gives 0.42*dR. The depth offocus is on the order of +/−0.5 mu, so dR/R would have to be controlled to 0.2%.

This focal point variability can be compensated by adjusting position of a very weak objective lens (WOL) 175 along the optical axis of collimated beam 70. The WOL 175 is most preferably located on a support structure which supports the slider 140 and optical head system 100, as shown in FIG. 4A. If focal variability of the SIL is too large to be compensated in this way, or if the WOL 175 is eliminated, then a better mechanism (than the FIG. 6 approach) is needed for setting the depth of the SIL in the hole.

Figure 7:
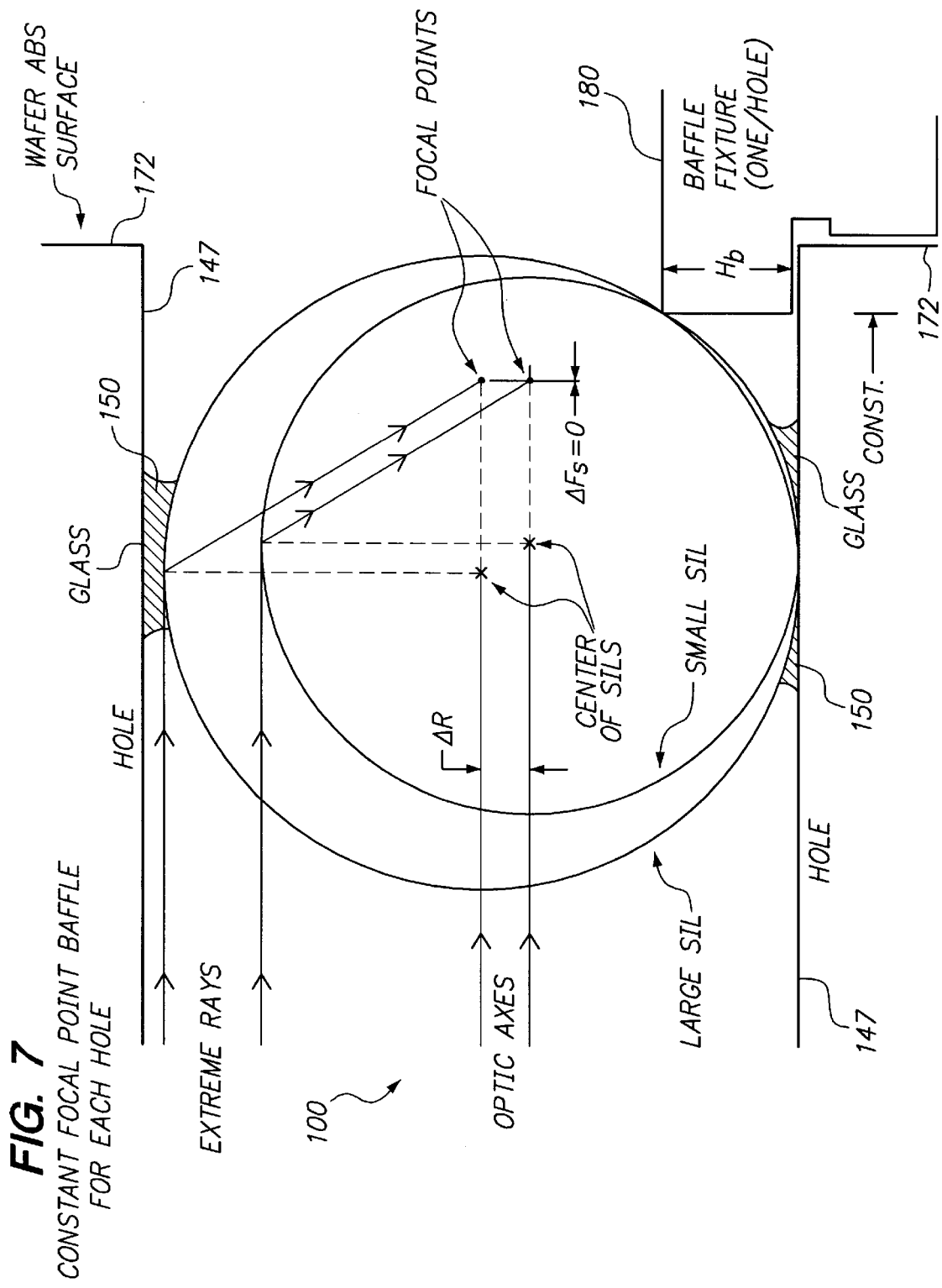
FIG. 7 is an enlarged diagram in elevation, showing an alignment method of forming a constant focal point baffle for each integrated objective-solid immersion lens system within a slider wafer hole in accordance with principles of the present invention.
Figure 8:
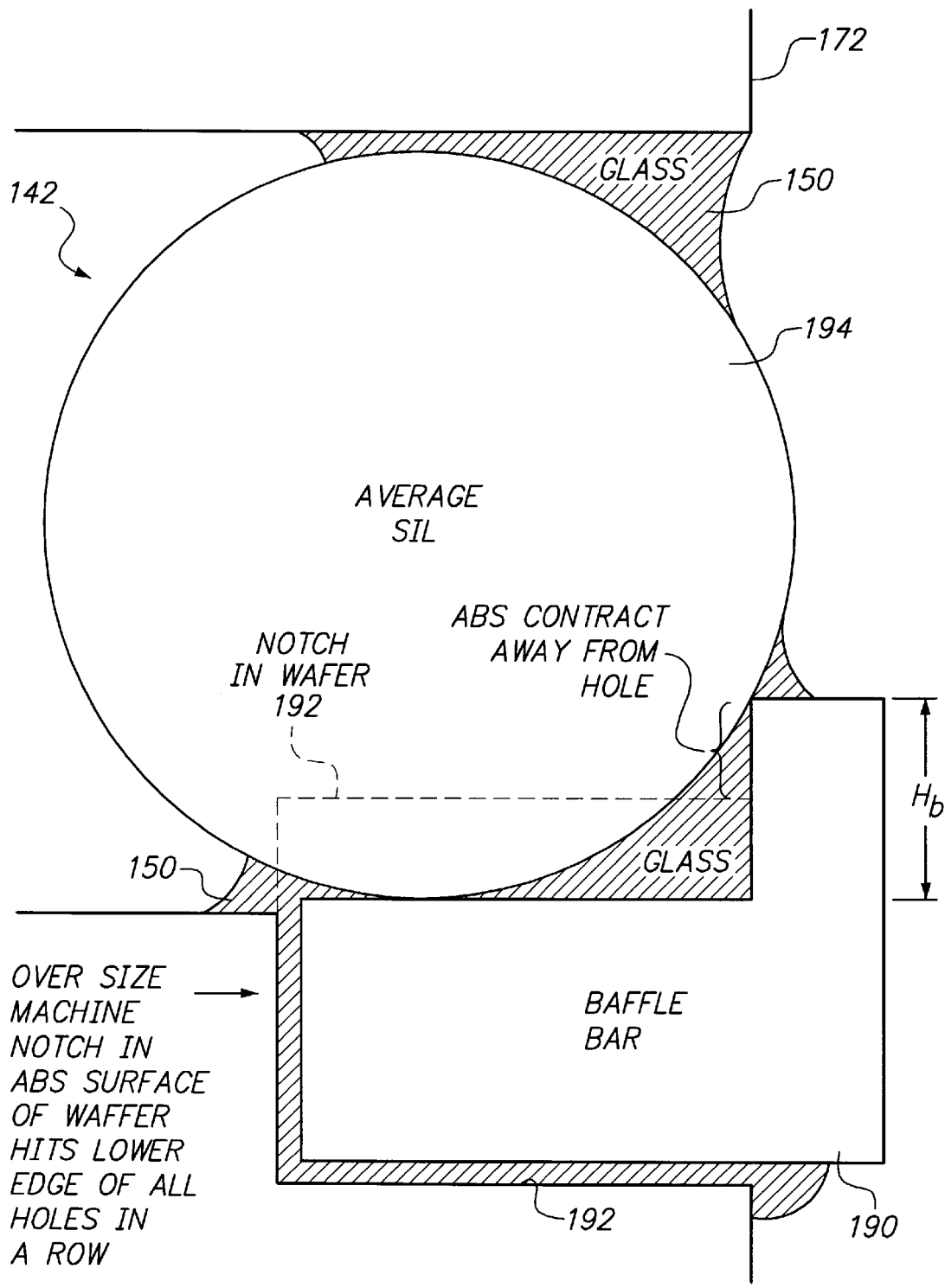
FIG. 8 is an enlarged diagram in elevation, showing an alternative alignment method of aligning an integrated objective-solid immersion lens system within a slider wafer hole in accordance with principles of the present invention.

Two precise alignment mechanisms are respectively illustrated in FIGS. 7 and 8. In both examples accurately machined and lapped ceramic baffle fixtures 180 and 190 contact the untapped SIL sphere at a corner point that is a well controlled distance, Hb, above the bottom surface of the wafer hole 142 in FIG. 7, or the fixture in FIG. 8. The system of equations in Appendix II specifies a baffle height Hb in terms of the nominal SIL radius such that the distance of the SIL center from the wafer ABS surface is dependent of the SIL diameter to first order.

Appendix I. Equations for OSIL Shape

If the focal point of an OSIL lens system is set up in the same way as in a SSIL system, equation 5 above, then the shape of the objective lens 120 is derived as follows. For simplicity, first set the wavelength and the SSIL radius to one (1). Next, imagine the space below the objective lens to air boundary in FIG. 4 to be filled with a liquid having a refractive index No. We want the shape of this boundary to be such that it achieves a focus at a distance from the intersection of this boundary with the optical axis α of Fo, the focal length of this lens. This means that all parallel rays in the air must have an equal number of wavelength to this focal point. The on-axis ray has No*Fo waves to this point, so the off-axis rays must have this number as well. Accordingly:

$$No^*Fo=(Yo-Y)+No^*\text{sqrt}((Fo-(Yo-Y))^2+X^2) \quad (A1.1)$$

The center of the coordinate system is the center of the yet-to-be-inserted SSIL as shown in FIG. 4. It is on the optical axis α at a distance Yo below the objective lens-to-air boundary that is specified by equation A1.1, above. Note that X and Y are the objective lens to air surface coordinates, and Y=Yo when X=0.

We also want an equation for this objective lens-to-air boundary that is tangent to an inserted spherical SSIL (having index Ns and radius=1.0) for the extreme rays. This tangent requirement can be dropped if the following equations are adjusted accordingly.

We must also satisfy the SSIL condition that the objective lens focal point be at a distance of:

$$Ys=Ns/No \quad (A1.2)$$

from the center of the SSIL (note that the effective index of the SSIL in this liquid environment is Ns/No). Also note that this condition can also be dropped for a different objective lens shape than is specified by equation A1.1, above. Thus, Fo=Yo+Ys, and equation A1.1 becomes:

$$No^*(Yo+Ys)=(Yo-Y)+No^*\text{sqrt}((Ys+Y))^2+X^2) \quad (A1.3)$$

With the tangent condition, and an implied requirement that the spherical SIL refract a parallel ray at this point to Fs=No/Ns, the solution for Yo is:

$$Yo=Ys^*(No-1)/2+1/(2^*Ys(No-1)) \quad (A1.4)$$

The Y of the tangential point is:

$$Yt=(Ns-Yo)^*(No-1) \quad (A1.5)$$

While the derivation of these foregoing equations is complex, it is relatively easy to verify that they satisfy the stated conditions with a few numerical examples. For example, if SIL index Ns=2, and objective lens index No=1.155 (realizeable with an "airogel" low density lens material), then A1.2 gives Ys=1.7316 (note that this value is nearly the square root of 3). Equation A1.4 then gives Yo=1.9971 (which is nearly 2.0), and equation A1.5 gives Yt=0.00045 (nearly zero). These values imply that the objective lens boundary just touches the SSIL at Yt=0. This gives the maximum numerical aperture for the assumed Ns, or NA=0.886.

If we choose an objective index No=1.414 (e.g. sqrt (2)) and the SIL index Ns=2, then Ys=1.414; Yo=1.1464; and, Yt=0.3535. This gives a NA of 0.66. To verify the tangential conditions at Yt first calculate Xt=sqrt (1−Yt$^2$)=0.9354. Then numerically plug these numbers into equation A1.3, above, and verify that the two sides of the equation are exactly equal. This process verifies that the objective lens touches the SSIL at Yt and Xt.

To verify the tangential constraint, take the derivative with respect to x of equation A1.3 and Y=sqrt(1−X$^2$) at Y=Yt=0.3535, and X=Xt=0.9354. Then, the derivative of equation A1.3 is:

$$0=-dY/dX+No((Ys+Y)^*dY/DX+X)/\text{sqrt}((Ys+Y)^2+X^2))$$

$$0=-dY/dX+1.414((1.414+0.3535)^*dY/dX+0.9354)/\text{sqrt}((1.414-0.3535)^2+0.9354^2)$$

$$0=(dY/dX)^*(-1+1.25)+0.9534/1.414$$

$$dX/dY=2.64$$

So, the slope of the objective lens at the point of contact with the SSIL is dY/dX=2.646. The slope of the SSIL at this point is:

$$dY/dX=S/\text{sqrt}(1-X^2)=0.9354/\text{sqrt}(1-0.93542)=2.645.$$

Although the derivation given directly above is mathematically somewhat tractable, it does not necessarily yield an optimum design. Unless No can be adjusted to a value that gives a highest numerical aperture NA (e.g. 1.155 for Ns=2), the design is sub-optimal because it yields a NA that is less than maximal. This drawback can be remedied by deviating from the SSIL strategy that sets the focal distance of the objective as measured from the SSIL center at Ns/No. If the optical system focal point is set at a minimum value which is:

$$Ys=R*\tan(\arcsin(1/NS)) \quad (A1.6)$$

from the SSIL center, then an objective lens shape can be found which is tangential to the SSIL at a maximum distance from the axis (Xt=R). This yields the maximum NA for a given SSIL Ns for arbitrary values of No. It is easy to calculate the maximum thickness (on the optical axis α) of this objective lens. The optical path length on the axis must be the same as for the extreme ray. Therefore:

$$No*To+Ns*(R+Ys)=No*(To+R)+Ns*R*\cos(\arcsin(1/Ns)). \quad (A1.7)$$

This equation is easy to solve for To, the maximum objective lens thickness. The solution for off-axis points is more difficult. However, for every Ns, No pair there is a curve which describes this maximum objective lens numeric aperture ($NA_{OL}$).

Appendix II. Automatic OSIL Positioning System

Figure 6:
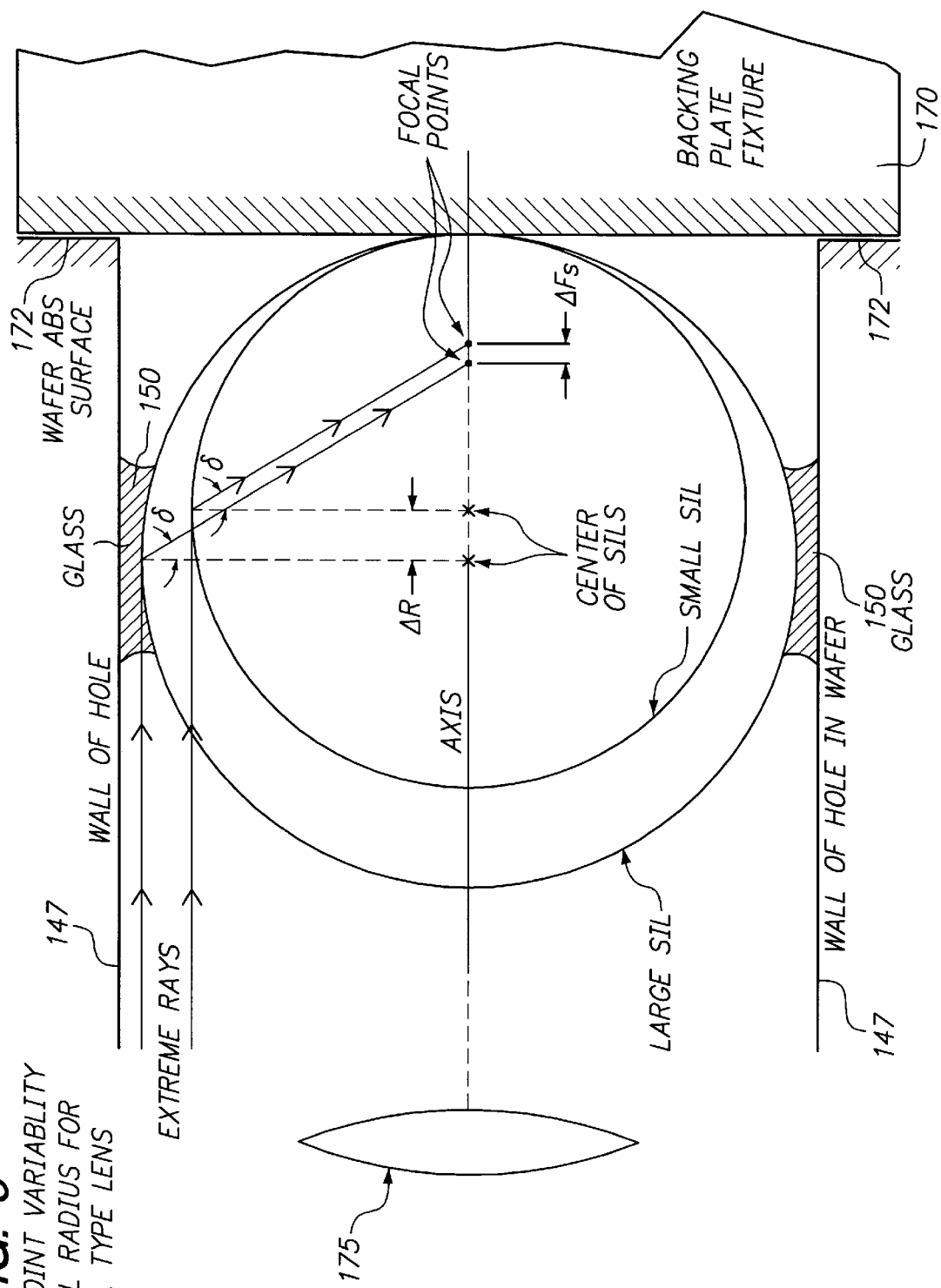
FIG. 6 is an enlarged diagram in elevation, showing focal point variability with radius of the solid immersion lens for an integrated objective-solid immersion lens system as shown in FIG. 4.

The center of the OSIL system 100 must be accurately positioned relative to the slider wafer surface during the OSIL-to-wafer bonding process, so that all of the resultant optical heads on a slider bar or wafer can be gang-lapped to the same controlled focal point. One standard approach is shown in FIG. 6. In the FIG. 6 approach, the backing plate 170 sets a back surface of the OSIL to be aligned with the intermediate (not finally lapped) wafer surface 172. Unfortunately, the FIG. 6 approach results in a focal position which is sensitive to the diameter of the OSIL unit 100.

This focal position sensitivity can be eliminated to first order by contacting the OSIL 100 with a corner (possibly with a bevel for stability against chipping) of a fixture, e.g. fixture 180 shown in FIG. 7, that is accurately registered to the wafer surface and the bottom surface of the hole (distance of Hb). However, the FIG. 7 approach requires that either the bottom surface of the wafer defining the holes provide a reference line, or that the fixtures 180 are individually set into each wafer hole 142. (A reference line can be formed by forming a precision trench cut across the bottom side 172 of the wafer.

A more readily implemented approach is shown in FIG. 8. A rectangular bar is notched to a depth of Hb to form baffle bar fixture 190. It is set into a trench 192 cut across the slider wafer such that all optical holes 142 are intercepted along a trench row. An unfinished SSIL sphere 194 (objective lens not yet formed or deposited on the sphere) is dropped into each hole 142 and glassed into position against the baffle bar 190, which is also glassed to the wafer. Most preferably, the wafer is set at an angle during the glass-bonding step, so that each sphere 194 nests into the notched corner of the alignment baffle bar 190.

In both methods, notch distance Hb is determined from the equations given hereinbelow. With this setting, the focal point is rendered independent of the variation in radius dR, provided that the variation is much, much less than the radius R (dR<<R). For example, if Ns=2, then Hb=R/2. With this geometry all of the focal points will be in the same location. After the bond is formed the objective lenses are formed or placed on respective unfinished SSIL spheres 194 in accordance with method steps set forth above. At any desired stage after the sphere 194 is glassed into place, the slider wafer itself, or slider bars divided from the wafer, may be lapped to form the final ABS 144 of the OSIL 100. Otherwise required fine adjustment of the focus at the single slider level should therefore be eliminated by using the procedure explained in conjunction with FIG. 8.

The equations by which the notch distance Hb in baffle bars 180 and 190 is determined for an OSIL system 100 having maximal NA are given as follows. The absolute limit on sine of the angle of refraction is 1/Ns. This limit corresponds to a ray that grazes the outer diameter of the OSIL (at which location the thickness of the objective lens 120 is zero) and is bent towards the focal point on the optical axis α (see FIG. 6). The angle to the normal at this point is rhomax and it is given by:

$$\text{rhomax}=\arcsin(1/Ns). \quad (A2.1)$$

Accordingly, the focal point will be at a distance, Fs, from the center of the OSIL given by:

$$Fs=R*\tan(\text{rhomax}) \quad (A2.2)$$

(note that this is not a conventional SSIL). The change in Fs with dR is then the derivative:

$$dFs/dR=\tan(\text{rhomax}). \quad (A2.3)$$

Now we want to match this with a value of Hb that yields the same derivative. The distance from the OSIL center to the contact point with the baffle, Xb, is given by:

$$Xb=\text{sqrt}(R^2-(R-Hb)^2)$$

$$Xb=\text{sqrt}(2*R*Hb-Hb^2) \quad (A2.4)$$

and its derivative is:

$$dXb/dR=Hb/\text{sqrt}(w*R*Hb-Hb^2). \quad (A2.5)$$

Setting equation A2.3 equal to equation A2.5, and solving for Hb gives:

$$Hb=2*R/(1+(1/\tan(\text{rhomax}))^2) \quad (A2.6)$$

As stated above, for Ns=2, rhomax is 30 degrees, its tangent is 0.58 and equation A2.6 gives Hb=R/2. Setting Hb to this value will give zero variability in Fs–Xb to first order in dR/R. However, Hb must be accurately controlled. For the present example, the variation in Xb is 58% of the variation in Hb.

In this example we have analyzed an OSIL system with maximal numeric aperture, NA. For Ns=2 as above, the NA=0.866. The index of the objective lens 120 in this case must be 1.155 and its maximum thickness on the axis would have to be R. This low index would require an optically transparent, low density "aero-jel" type of aerated plastic foam, and this thickness would require an injection molding process.

For OSILs with less than this maximum NA, and SSILs, a similar set of equations can be derived that yield zero radial sensitivity to the focal spot position. The SIL focal point is determined almost exclusively by the objective lens setting, so it does not need this approach as much. However, if this approach is used to set a SIL in place, then the best corner height, Hb, is the smallest value that can be controlled accurately and that can be used to set the position. In this case the positional variation with R is:

$$dXb/dR=\text{sqrt}(2*Hb/R) \quad (A2.7)$$

This result compares well with the standard approach outlined in connection with FIG. 6 above that yields dXb/dR=1. For Hb=R/8 the positional sensitivity is half that of the standard approach.

It is to be understood that the particular implementations described are intended as illustrations of, and not as limiting the scope of, the claims. It will of course be appreciated that in the development of any such actual implementation, numerous implementation-specific decisions must be made to achieve the developers' specific goals, such as compliance with system-related and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Although the present invention has been described in terms of the presently preferred embodiment, it should be clear to those skilled in the art that the present invention may also be utilized in conjunction with, for example, standard SIL systems and methods. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An objective-solid immersion lens assembly comprising:
   a unitary solid immersion lens means having an optical axis;
   an evanescent wave conducting region along the optical axis and a substantially spherical surface portion surrounding the optical axis oppositely the wave emitting region; and
   a discrete objective lens attached to the solid immersion lens means at the substantially spherical surface portion in alignment with the optical axis, the discrete objective lens also attached to the surface portion by a light-transparent adhesive material, the light-transparent adhesive material having an index of refraction intermediate between an index of refraction of the solid immersion lens and an index of refraction of the discrete objective lens.

2. An objective-solid immersion lens assembly comprising:
   a unitary solid immersion lens means having an optical axis;
   an evanescent wave conducting region along the optical axis and a substantially spherical surface portion surrounding the optical axis oppositely the wave emitting region;
   a discrete objective lens attached to the solid immersion lens means at the substantially spherical surface portion in alignment with the optical axis; and
   an air bearing slider for mounting the assembly, the wave conducting region is aligned with an air bearing surface of the air bearing slider by a lapping process following attachment of the solid immersion lens assembly to a body comprising the air bearing slider.

3. A method for making an objective-solid immersion lens and air bearing slider comprising the steps of:
   forming an objective lens on a substantially spherical optical body,
   forming a hole in a slider wafer body,
   securing the spherical body and objective lens to the slider wafer body in the hole in alignment with an optical axis normal to a major surface of the wafer body oppositely of the objective lens,
   lapping the major surface of the wafer body and a portion of the optical body to form an air bearing surface as well as an evanescent wave conducting region of the optical body at the air bearing surface, and
   forming the wafer body into a discrete slider including the air bearing surface and objective-solid immersion lens.

4. The method set forth in claim 3 wherein the lapping step forms the optical body into a solid immersion lens (SIL).

5. The method set forth in claim 3 wherein the lapping step forms the optical body into a super solid immersion lens (SSIL).

6. The method set forth in claim 3 wherein the step of securing the spherical body in the wafer hole comprises the further step of positioning a backing plate fixture against the wafer major surface and positioning the spherical body against the backing plate fixture.

7. The method set forth in claim 3 wherein the step of securing the spherical body in the wafer hole comprises the further steps of forming a precise contact region along a baffle bar fixture at a height Hb, registering the baffle bar fixture in alignment with the wafer at the major surface, and aligning the spherical optical body in contact with the precise contact region prior to securing the spherical body in the wafer hole.

8. The method set forth in claim 7 comprising the further steps of providing a precision notch in the wafer body, and securing the baffle bar fixture in the notch in order to register the baffle bar fixture in alignment with the wafer at the major surface.

9. The method set forth in claim 3 wherein the spherical optical body comprises a glass material, wherein the slider water comprises a ceramic material, and wherein the step of securing the spherical optical body to the wafer in the hole is carried out by a step of low temperature glass bonding.

10. A method for making and objective-solid immersion lens and air bearing slider comprising the steps of:
    forming a hole in a slider wafer body,
    securing the spherical body to the slider wafer body in the hole in alignment with an optical axis normal to a major surface of the wafer body,
    forming an objective lens on a substantially spherical portion of the optical body in alignment with the optical axis at a location oppositely of the major surface of the wafer body,
    lapping the major surface of the wafer body and a portion of the optical body to form an air bearing surface as well as an evanescent wave conducting region of the optical body at the air bearing surface, and
    forming the wafer body into a discrete slider including the air bearing surface and objective-solid immersion lens.

11. The method set forth in claim 10 wherein the lapping step forms the optical body into a solid immersion lens (SIL).

12. The method set forth in claim 10 wherein the lapping step forms the optical body into a super solid immersion lens (SSIL).

13. The method set forth in claim 10 wherein the step of securing the spherical body in the wafer hole comprises the further step of positioning a backing plate fixture against the wafer major surface and positioning the spherical body against the backing plate fixture.

14. The method set forth in claim 10 wherein the step of securing the spherical body in the wafer hole comprises the further steps of forming a precise contact region along a baffle bar fixture at a height Hb, registering the baffle bar fixture in alignment with the wafer at the major surface, and aligning the spherical optical body in contact with the precise contact region prior to securing the spherical body in the wafer hole.

15. The method set forth in claim 14 comprising the further steps of providing a precision notch in the wafer body, and securing the baffle bar fixture in the notch in order to register the baffle bar fixture in alignment with the wafer at the major surface.

16. The method set forth in claim 10 wherein the spherical optical body comprises a glass material, wherein the slider wafer comprises a ceramic material, and wherein the step of securing the spherical optical body to the wafer in the hole is carried out by a step of low temperature glass bonding.

* * * * *